Patented Feb. 24, 1953

2,629,681

UNITED STATES PATENT OFFICE 2,629,681

INSECTICIDAL COMPOSITION COMPRISING A THERMAL DECOMPOSITION PRODUCT OF PENTACHLORPENTADIENOIC ACID

Hubert M. Hill, Rochester, N. Y., assignor to Eastman Kodak Company, Rochester, N. Y., a corporation of New Jersey No Drawing. Application December 20, 1949, Serial No. 134,118

3 Claims. (Cl. 167—22)

This invention relates to compositions useful for insecticidal purposes. More specifically, the invention is concerned with insecticidal compositions containing as the active principal thereof the product which results from subjecting pentachloropentadienoic acid to an elevated temperature. Compounds to be of value for insecticidal purposes should ordinarily be light stable, miscible with light paraffinic mineral oils, free from harmful effects to plants, free of a tendency to stain walls, fabrics, etc., and be not offensive to human beings.

Many of the insecticides which are known at the present time are either short-lived in effectiveness or have other characteristics which prevent those insecticides from being of general application.

One object of my invention is to provide insecticidal compositions which are highly toxic to insects but are of low toxicity to man and other warm-blooded animals. Another object of my invention is to provide insecticidal compositions which are simple to use but are highly effective against the various insects which are of a destructive nature, such as to plant life, foodstuffs or textile materials. A further object of my invention is to provide an active insecticidal element in a form in which it is useful for combating harmful insect life. Other objects of my invention will appear herein.

I have found that the product resulting from the heat decomposition of pentachloropentadienoic acid is particularly effective as an insecticidal material. There are two known pentachloropentadienoic acids, one melting at 125° C. and the other melting at 96° C. I have found that by subjecting the higher melting acid to heat, such as a temperature within the range of 150–300° C. hydrogen chloride is driven off from this material and a new product is formed. This new product is a yellow-white crystalline solid melting at 78.5–80° C. which can be distilled at 270° C. without decomposition. The chemical structure of this compound is not known although the empirical formula thereof is $C_5Cl_4O_2$, it is slowly soluble in 5% sodium hydroxide solution, and it is thought that possibly it may be a cyclic lactone. This compound when formed into compositions with a suitable carrier therefor is effective against the common insect pests, the destruction of which is desirable.

The insecticidal value of this material thermally obtained from pentachloropentadienoic acid is shown by various tests carried out by contacting insects therewith. For instance, by preparing a dust thereof with an inert carrier such as pyrophyllite and after placing fruit flies in a bottle, sprinkling them with this dust and observing the flies at intervals, it may be seen that a substantially complete kill of those fruit flies is obtained in a short time even though the material is employed in a concentration of one part thereof in 1000 parts of carrier. Another method of determining the effectiveness of this compound as an insecticide is to dip a piece of filter paper into a solution of the compound in an organic solvent and after allowing the paper to dry, placing it in a jar containing the fruit flies. Substantially complete kill is obtained in but a very short time with the thermal decomposition product described herein. The insecticidal compositions in accordance with my invention are effective against various types of insect pests, such as houseflies, silverfish, bean beetles, flea beetles, cucumber beetles, aphids, red spiders and other mites, thrips, etc.

The proportion of the thermal decomposition product of pentachloropentadienoic acid which is employed in insecticidal compositions in accordance with my invention may be varied over a wide range. For instance, insects having little or no protective covering are readily susceptible to the effect of this product and, thus, even as little as 0.5% thereof would be effective. Ordinarily, however, a higher percentage of this compound is desirable being most useful in the proportion of 2–10% in the composition. In compositions in accordance with my invention other insecticidal materials may be incorporated either as an addition thereto or to displace part of the thermal decomposition product of the pentachloropentadienoic acid. For instance, insecticides such as pyrethrum, rotenone, nicotine, calcium or lead arsenate, paradichlorobenzene or the like may be incorporated in compositions in accordance with my invention. Also, fungicidal materials such as lime-sulfur, sulfur, Bordeaux mixture, mercury compounds or the like may be included. It may sometimes be desirable to incorporate synergists in organic compositions in accordance with my invention. Some compounds which themselves do not exhibit insecticidal properties but which increase the effectiveness of insecticides are piperonyl butoxides, piperonyl propoxide and piperonyl butyl carbitol oxide. Although the proportion of synergist employed is not critical, ordinarily an amount in the range of 0.5–2% is most suitable for use.

I have found that petroleum distillates are particularly effective as solvents in preparing insecticidal compositions in accordance with my invention, particularly petroleum distillates having a boiling range of 80–150° C. For dusting compositions I have found pyrophyllite to be of advantage as a carrier for the thermal decomposition product of pentachloropentadienoic acid as described herein.

The following example illustrates the preparation of the active insecticidal material of my invention:

*Example 1.*—A small amount of pentachloropentadienoic acid having a melting point of 125° C. (J. A. C. S. 71, 946–51) was placed in a distilling flask and subjected to a temperature of 150–300° C. Considerable hydrogen chloride was evolved and as the temperature reached 270° C., the resulting product distilled from the flask and was cooled. This compound crystallized to a yellow solid upon cooling. Recrystallization from petroleum ether gave a compound melting at 78.5–80° C. This compound is effective for insecticidal purposes with various carriers such as pyrophyllite, finely divided sulfur, talc, finely divided diatomaceous earth and the like.

The following examples illustrate insecticidal compositions in accordance with my invention:

*Example 2.*—500 parts of magnesium oxide was impregnated with 15 parts of a solution of the thermal decomposition product of pentachloropentadienoic acid in 275 parts of ethanol. The resulting paste was dried and ground to a powder, which powder was useful both for insecticidal and fungicidal purposes. Instead of magnesium oxide, pyrophyllite, bentonite, infusorial or the like may be employed as the carrier.

*Example 3.*—35 parts of the thermal decomposition product of pentachloropentadienoic acid was dissolved in 550 parts of methyl acetate and 900 parts of bentonite was impregnated with the solution. The resulting mass was dried and 25 parts of diisopropyl naphthalene sulfonate and 10 parts of sodium bicarbonate was added, and the mass was ground in a ball mill. The powder was then mixed with a solution of 10 parts of gelatin and 10 parts of potassium dichromate in 1300 parts of water. The paste so obtained was dried under reduced pressure and powdered. The powder thus obtained readily mixes with water to form an aqueous emulsion which upon spraying adheres well to the surfaces upon which this spray was applied. Instead of gelatin in this composition there may be employed water-soluble methyl cellulose, cellulose sodium sulfate, or the sodium salt of carboxymethyl cellulose.

*Example 4.*—1 part of the thermal decomposition product of pentachloropentadienoic acid was ground with 2 parts of an aqueous paste of 2 parts of sodium lignin sulfonate and was emulsified with 100 parts of water. An aqueous emulsion was obtained useful for spraying purposes to kill insects or as a fungicide.

*Example 5.*—10 parts of the thermal decomposition product of pentachloropentadienoic acid was mixed with 1 part of pyrethrum extract in solution in 1000 parts of kerosene. A solution useful for spraying purposes was obtained.

*Example 6.*—10 parts of the thermal decomposition product of pentachloropentadienoic acid together with 1 part of piperonyl butoxide was mixed with 1000 parts of difluorodichloromethane and placed in a bomb. This composition when sprayed in the air is an excellent insecticide.

*Example 7.*—3 parts of the thermal decomposition product of pentachloropentadienoic acid was dissolved in 500 parts of kerosene together with 2 parts of DDT and 1 part of the synergist, piperonyl butoxide. A composition having excellent insecticidal properties was obtained.

I claim:

1. A composition effective for the killing of insects which comprises a mixture of .05–10% of the product resulting from thermally decomposing pentachloropentadienoic acid having a melting point of approximately 125° C. by subjecting the same to a temperature within the range of 150–300° C. until evolution of HCl ceases, and 90–99.5% of a carrier therefor.

2. A composition effective for the killing of insects comprising the mixture of 0.5–10% of the product resulting from the thermal decomposition of pentachloropentadienoic acid having a melting point of 125° C. by subjecting the same to a temperature within the range of 150–300° C. until evolution of HCl ceases, and 90–99.5% of pyrophyllite as the carrier therefor.

3. A composition effective for the killing of insects comprising the mixture of 0.5–10% of the product resulting from the thermal decomposition of pentachloropentadienoic acid having a melting point of 125° C. by subjecting the same to a temperature within the range of 150–300° C. until evolution of HCl ceases, and 90–99.5% of kerosene as the carrier therefor.

HUBERT M. HILL.

REFERENCES CITED

The following references are of record in the file of this patent:

UNITED STATES PATENTS

| Number | Name | Date |
| --- | --- | --- |
| 2,485,680 | Wachs | Oct. 25, 1949 |

OTHER REFERENCES

Prins Recueil des Trav. Chim. des Pay-Bas. vol. 65, pages 460 to 461.

Zincke: Berichte de Deut. Chem. Ges. 21 (1888), pages 2728 and 2729.

Holmes: Washington Times-Herald, May 21, 1949.